Patented Aug. 23, 1932

1,872,876

UNITED STATES PATENT OFFICE

WILLIAM G. BJORKSTEDT, OF JAMAICA, NEW YORK, ASSIGNOR TO DOHERTY RESEARCH COMPANY, OF NEW YORK, N. Y., A CORPORATION OF DELAWARE

ZIRCON REFRACTORY

No Drawing. Application filed November 11, 1926, Serial No. 147,847. Renewed May 20, 1930.

This invention relates to the manufacture of zircon refractories and is based primarily on my discovery that phosphoric acid may be used as a bonding agent for zircon particles. Relatively small amounts of phosphoric acid exert a bonding action sufficient to insure a firmly coherent product,—for example, amounts as small as one-tenth per cent by weight of the finished product calculating the phosphoric acid in terms of phosphorus pentoxide $P_2O_5$. In general however I have found it to be more practical to employ a greater proportion of phosphoric acid than that indicated as being merely sufficient to effect coherence of the zircon particles. The most desirable minimum of $P_2O_5$ is about three per cent. Much greater proportions of the acid may be used but due to its hygroscopic nature it will usually not be practical to employ a greater proportion than thirteen per cent calculated in terms of $P_2O_5$.

In addition to discovering that phosphoric acid is a suitable bonding agent for zircon, I have further discovered that by varying the amount of the acid in the mixture (zircon phosphoric acid mixture) I am enabled to control the change in volume of the mixture during firing incident to bonding. Thus I have found that if the $P_2O_5$ forms approximately six per cent by weight of the mixture the latter will neither expand nor contract during firing to bonding temperature. On the other hand if the $P_2O_5$ content is only three per cent, the mixture on firing will shrink about two and one-fourths per cent while if it contains nine per cent of $P_2O_5$ it will expand about six-tenths per cent. It will therefore be seen that a material increase of $P_2O_5$ over six per cent causes some expansion of the mixture during firing while a material decrease below six per cent causes a material shrinkage of the mixture during firing.

The property of the zircon phosphoric acid mixture to maintain its prefiring volume substantially constant during firing or to shrink or expand in conformity with the percentages above specified depends in a measure on the fines present in the aggregate. The figures above given are based on a zircon aggregate consisting of approximately equal parts of natural grain particles and milled grain of 200-mesh or finer. The invention in its broad aspect is however not limited to any particular proportion between natural grain and fines.

I prefer to mix the zircon particles with phosphoric acid as such, more particularly orthophosphoric acid, not only on account of its relative cheapness but primarily because I thereby avoid the introduction of undesirable substances into the mixture, that is to say, substances which would be a factor in determining the desirability or suitability of the product for particular uses. I consider it, however, to be within the scope of my invention to mix the zircon with a phosphate, either organic or inorganic, and in the case of a phosphate which does not decompose at a low temperature, to treat the phosphate with an acid capable of decomposing the phosphate.

One of the important features of the present invention is that a firmly coherent product of substantially maximum strength is produced when the mixture is fired to a temperature in the neighborhood of 420° F. However if the refractory is to be exposed to a moist atmosphere it is necessary that it be fired to a much higher temperature in order to prevent its ultimate deterioration by moisture. Absorption of moisture by the product fired to only 420° F. I consider to be due to the fact that the phosphoric acid is only partially dehydrated. The higher the firing temperature the more stable becomes the refractory product because of more complete dehydration of the acid. When fired to temperatures in the neighborhood of 1800° F. to 2000° F., the resultant product shows no tendency to deteriorate on prolonged exposure to moisture. As a general rule, however, firing temperatures of approximately 750° F. will be found amply sufficient to give a product having sufficient stability for most purposes especially where the $P_2O_5$ content is not substantially in excess of six per cent.

The refractory produced according to my invention is highly resistant to heat, is hard and can be made to take a high polish. For these reasons among others the refractory finds many special applications in the arts. As an instance of such application may be mentioned its suitability as a cylinder lining for internal combustion engines. It is also admirably adapted for use as molds for metal die casting.

What I claim is:

1. A method of bonding zircon particles to form a refractory body whose volume after bonding is substantially the same as its volume before bonding comprising heating said particles admixed with such an amount of phosphoric acid that the acid calculated as phosphorus pentoxide equals approximately six percent of the dry product.

2. A method of bonding zircon particles to form a refractory body whose volume after bonding is substantially the same as its volume before bonding comprising heating said particles admixed with such an amount of phosphoric acid that the acid calculated as phosphorus pentoxide equals approximately six percent of the dry product, the zircon particles being an aggregate of fines and natural grains.

3. A method of bonding zircon particles to form a refractory body whose volume after bonding is substantially the same as its volume before bonding comprising heating said particles admixed with such an amount of phosphoric acid that the acid calculated as phosphorus pentoxide equals approximately six per cent of the dry product, the zircon particles being an aggregate of approximately equal parts of natural grains and milled grain of relatively fine size.

4. A method of bonding zircon particles to form a refractory body whose volume after bonding is substantially the same as its volume before bonding comprising heating said particles admixed with such an amount of phosphoric acid that the acid calculated as phosphorus pentoxide equals approximately six percent of the dry product, the heating temperature being between 550° and 750° F.

5. A refractory product consisting of zircon bonded by the reaction products of phosphoric acid, the acid calculated as $P_2O_5$, constituting six percent of the product.

In testimony whereof I affix my signature.

WILLIAM G. BJORKSTEDT.